March 4, 1941.   A. H. LAMB   2,233,616
RELAY CONTROL DEVICE
Filed March 10, 1939   3 Sheets-Sheet 1

March 4, 1941.  A. H. LAMB  2,233,616
RELAY CONTROL DEVICE
Filed March 10, 1939  3 Sheets—Sheet 2
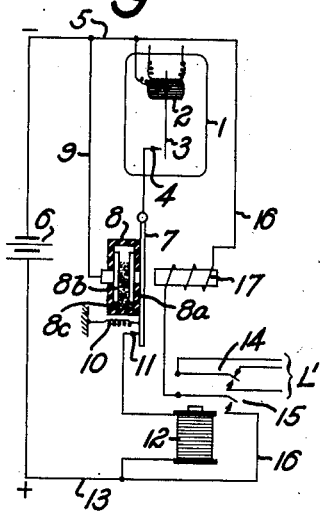
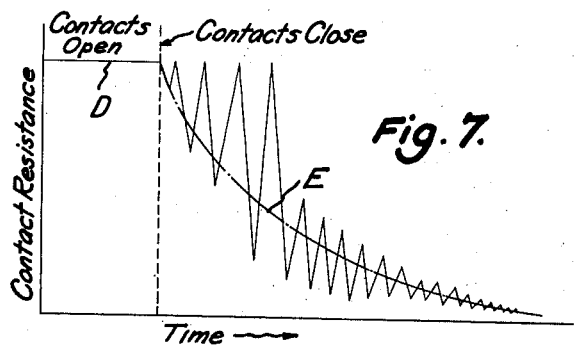
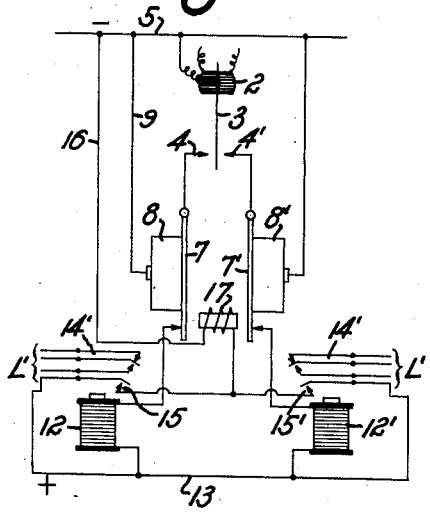
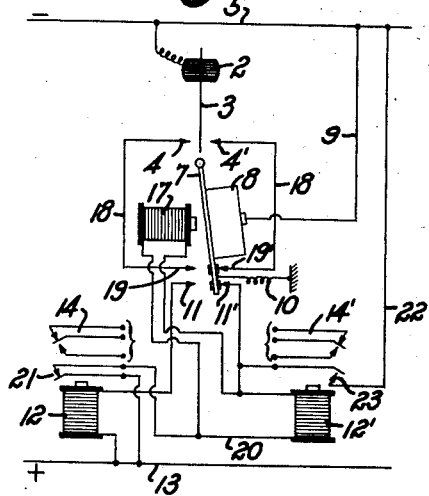
Inventor:
Anthony H. Lamb,
By Potter, Pierce + Scheffler,
Attorneys.

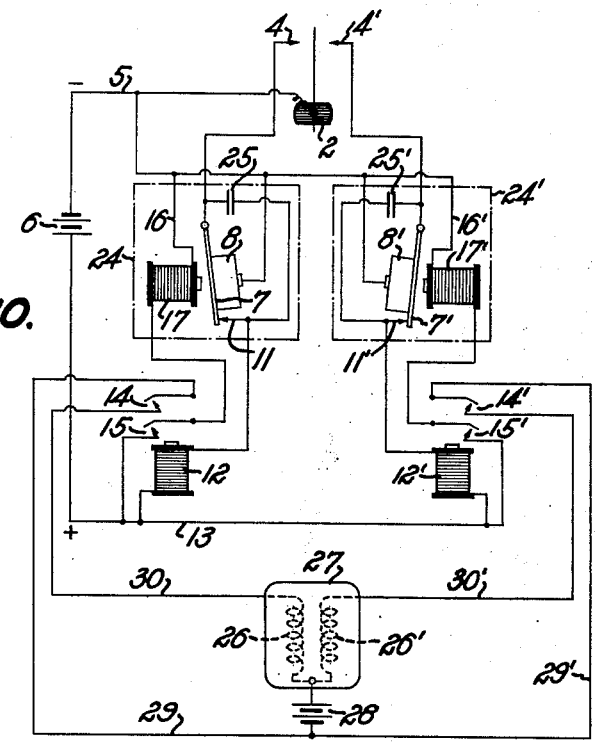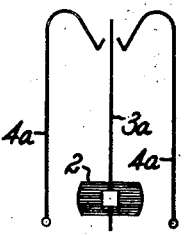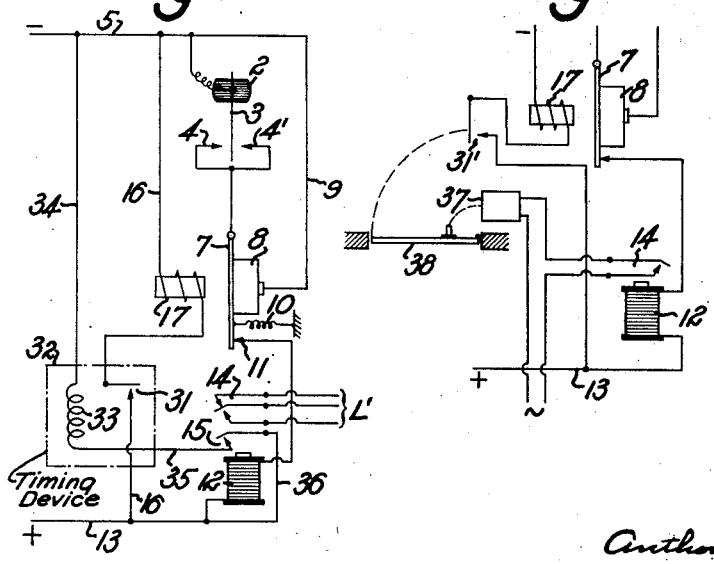

Patented Mar. 4, 1941

2,233,616

UNITED STATES PATENT OFFICE 2,233,616

RELAY CONTROL DEVICE

Anthony H. Lamb, East Orange, N. J., assignor to Weston Electrical Instrument Corporation, Newark, N. J., a corporation of New Jersey Application March 10, 1939, Serial No. 261,149

22 Claims. (Cl. 175—320)

This invention relates to control circuits and devices, and particularly to control apparatus of high sensitivity that is reliable in operation when subjected to minute actuating currents.

Control circuits that are operated only at rare intervals or possibly only once during their useful life may develop faults that prevent the flow of an actuating current of the expected magnitude upon a closure of the primary control circuits. In harbor defense systems, for example, it may be impractical to test the firing circuits of submarine mines but it is essential that the firing circuits function properly even when there are relatively serious faults that reduce the control impulses to a small fraction of the normal value.

The minute current flow may result from an abnormal condition in such control circuits, but there are other control systems in which the primary control impulse never exceeds a minute magnitude. Control systems of this type include a sensitive or ultra-sensitive relay or its equivalent in a primary control circuit and a less sensitive relay or device in a controlled circuit for actuating electrical switches, reversible electric motors or mechanical control devices.

The contacts of relatively insensitive relays may slide against each other under pressures that afford good contact closures in spite of undetectable films of oxide, oil or moisture, invisible particles of dirt, etc. The reliability of the contact closure decreases with increasing sensitivity of the instrument relay, and various expedients have been proposed in attempts to obtain reliable control action from ultra-sensitive relays. The term "ultra-sensitive" will be used in the following specification and claims to indicate a sensitivity of an order which, as applied to electrical instrument relays, corresponds to operation on a few microamperes or millivolts.

The degree of success achieved in the use of ultra-sensitive relay and control devices in the past has depended upon the rigidity of the design requirements that were to be met. Equipment that is reliable in operation when given relatively rigid support may be defective or practically inoperative when used on aircraft and other moving objects. The complexity of auxiliary equipment of the "dropping bar," and cold cathode gaseous discharge tube types, limits the use of such arrangements; and such expedients as locking power relays, large condensers, etc., are not adapted for use with ultra-sensitive relays as they result in a rapid destruction of the relay contacts.

Objects of the present invention are to provide sensitive control circuits and devices of simple construction that are reliable in operation, over long periods, when subjected to minute control impulses. An object is to provide a control system including a controlled circuit having, in series, a current source, a variable resistance of the coherer type, a reactive impedance, and a current-responsive device; and circuit elements for producing an induced voltage surge across the coherer to reduce its resistance to a current-conductive value; the circuit elements constituting a single primary control circuit coupled or connected to the controlled circuit to establish an initial current impulse through the reactive impedance. An object is to provide a control system of the type just stated in which the current-responsive device has an inductive winding or windings and constitutes the reactive impedance of the controlled circuit. An object is to provide a sensitive control system including a controlled circuit having, in series, a current source, a variable resistance of the coherer type, and an inductive current-responsive device; and circuit elements for producing an initial current surge in the controlled circuit, the circuit elements consisting of a primary control circuit shunted across the coherer and including an ultra-sensitive instrument relay. A further object is to provide a control system including a coherer in series with a current source and a current-responsive device, a primary control circuit for reducing the resistance of the coherer to a current-conducting value, and a resetting device for the coherer independent of the current-responsive device. More specifically, an object of the invention is to provide a relay or control circuit including a sensitive instrument relay having freely vibrating spring contacts, a controlled circuit including a coherer in series with a low voltage current source and a highly inductive current-responsive device; the instrument relay contacts being shunted across one of the elements of the controlled circuit to establish an initial current pulse through the inductive current-responsive device, thereby to produce an inductive voltage discharge through the coherer to reduce its resistance to a current-conductive value.

These and other objects and advantages of the invention will be apparent from the following specification when taken with the accompanying drawings in which:

Figs. 1 to 5, inclusive, are schematic diagrams of embodiments of the invention;

Fig. 6 is a circuit diagram of a control circuit that includes a resetting device for the coherer;

Fig. 7 is a curve sheet showing a typical variation of contact resistance with time when sensitive contacts move into engagement;

Figs. 8 to 12 are circuit diagrams of different embodiments of the invention; and Figs. 13 to 15 are fragmentary plan views of different types of vibratory contacts.

Figure 1:
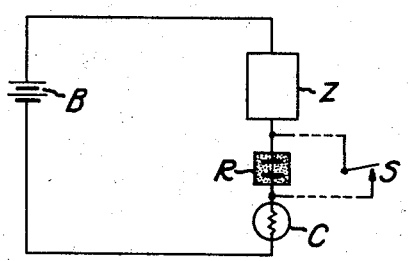

In the schematic diagrams, the reference character B identifies a current source in series with a reactive impedance Z, a variable resistance R of the coherer type, and a current-responsive device C which may be an alarm or signal device or, as shown, the ignition wire of an anchored submarine mine. The elements of this controlled circuit are supported in or on the mine and a firing circuit is shunted across the coherer and extends to a switch S at a land station. Current flow is blocked by the high resistance of the coherer R and, under normal circuit conditions, the closing of the switch S provides a low resistance path for current flow to the ignition wire. If the resistance of the firing circuit is abnormally high, the current flow may be so small that the ignition wire C is not heated to the ignition temperature of the detonator. In such cases, the switch S is opened to interrupt the current flow and the voltage surge of the reactive impedance Z is discharged through the coherer R and reduces its resistance to a current-conductive value, thereby establishing a current flow that heats the ignition wire of the device C to fire the mine.

Figure 2:
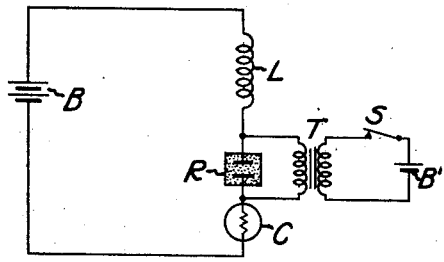

As shown in Fig. 2, the impedance may be an inductance L, and the primary control circuit may take the form of a transformer T having a secondary winding shunted across the coherer and a primary winding in series with a switch S and current source B'. The transformer is so designed that the high resistance of the normally open primary circuit is reflected into the secondary circuit to prevent current flow from the source B. Alternatively, a condenser could be inserted in the secondary circuit. A closure of the switch S results in a current pulse in the controlled circuit, and the high inductance of the coil L produces a voltage surge through the coherer R to reduce its resistance to a conductive value.

Figure 3:
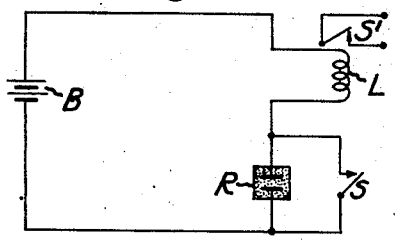

As shown in Fig. 3, the current-responsive device and reactive impedance may consist in a single element L which is the solenoid winding for actuating a relay switch S'. The circuit is, in other respects, similar to the Fig. 1 circuit.

Figure 4:
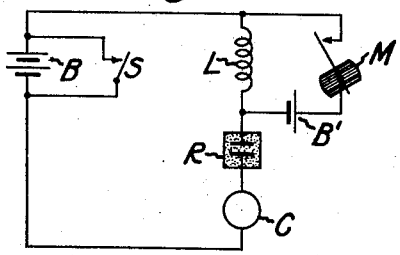

The arrangement of the primary control circuit in shunt with the coherer R is not essential as the initial current pulse in the controlled circuit may be obtained, as shown in Fig. 4, by primary control circuits that shunt the current source B or the reactive impedance L. A manually operated switch S may be shunted across the current source B, or an automatic primary control circuit comprising a current source B' and the contacts of a measuring instrument relay M may be shunted across the inductance L.

Figure 5:
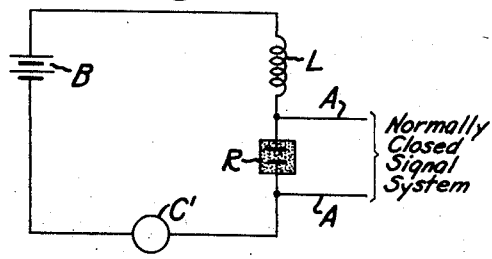

In the circuit of Fig. 5, the series elements of the controlled circuit are the current source B, an inductance L, the coherer R and an alarm device C'. The current source B energizes a normally closed signal system through leads A that are connected to the opposite terminals of the coherer R. This signal system may be a fire alarm system, a railway traffic control system or the like, which draws current from the source B. This current flow is interrupted in the case of a fault which opens one of the leads A, and this interruption of current flow through the inductance L results in a voltage surge that is discharged through the coherer R, thus reducing the ohmic resistance of the coherer to a current conducting value. Current flow is thereby established through the alarm device C' to advise the operator that the signal system is no longer operative. The coherer resistance may be restored to its normally high value, after repair of the signal system, by manually jarring the coherer.

Similarly, a manual resetting of the coherer may be employed with the circuits of Figs. 1 to 4 when the current-responsive device is an alarm or signal capable of repeated actuations. Stability of operation of control circuits that are energized only after long periods is thus obtained by the use of a coherer resistance in conjunction with a reactive impedance, capacitive or inductive, that produces a high voltage surge when subjected to a minute current flow. The initial current surge developed by the primary control circuit may be relatively small and far below its intended value, but the inductive voltage discharge that it produces in the controlled circuit reduces the normally high resistance of the coherer to a current-conductive value.

In the circuit diagram, Fig. 6, an ultra-sensitive instrument type relay 1 has a moving system 2 that displaces a contact arm 3 with respect to a relatively stationary contact 4. The instrument movement is shown diagrammatically as the pivoted coil of an electrical measuring instrument but other types of ultra-sensitive measuring instruments, for instance such as weighing scales, etc., may be employed to control the primary contacts of the relay system. The contact arm 3 is connected through lead 5 to one terminal of a current source 6. The current source may be of any voltage and frequency but is preferably a low voltage direct current supply such as obtained from the illustrated battery or by rectification of alternating current. The lead 5 is shown connected to the negative terminal of the direct current source although it may be connected to either polarity.

Contact 4 of the instrument relay is connected to the pivoted plate 7 on which a variable resistance 8 of the coherer type is mounted. The resistance comprises a pair of spaced electrodes 8a, 8b between which conducting particles 8c are loosely arranged. Electrode 8a is in electrical contact with the plate 7 and electrode 8b is connected to the negative line 5 of the current source by a lead 9; the resistance being thereby shunted across the instrument relay contacts 3, 4. A spring 10 normally holds the plate 7 against a contact 11 which is connected through the solenoid winding of a power relay 12 to the positive lead 13 from the current source. The power relay controls a switch system 14 of any desired type in a load circuit or circuits, not shown, indicated by the bracket L'. The relay 12 also actuates the normally open switch 15 in the circuit 16 that connects the winding 17 of the coherer resetting device between the source leads 5, 13.

The operation of the circuit will be best understood by first considering the curve sheet, Fig. 7, in which the solid line D is typical of the variation of contact resistance during a short interval, of the order of a few thousandths of a second, at a closing of the contacts of any sensitive relay. The portion of curve D at the left of the dotted line labelled "Contacts close" corresponds to the high resistance between the relay contacts under the open circuit condition that is indicated by the legends "Contacts open." The broken line curve E at the right of the dotted line illustrates the rheostatic decrease in contact resistance that is obtained when a pair of contacts are forced into engagement by a progressive movement of the contacts towards each other. In addition to this rheostatic decrease in resistance, line E, there is an intermittent opening and closing of the contacts of a sensitive relay due to the slight vibration which exists in all ordinary locations, as in a building, and is very pronounced when the relay is on an airplane or moving vehicle, or when vibration is inherent in the measuring device such as when measuring alternating current values. This fluttering of the contacts may persist for some time and, in the past, has resulted in faulty operation and arcing at the contacts. The present invention makes use of this fluttering action to obtain reliable operation of the relay circuit.

Reverting to Fig. 6, it will be seen that the power relay 12 is normally connected across the current source through the leads 5, 9, variable coherer resistance 8, plate 7, contact 11, and lead 13. The ohmic resistance of the coherer 8 is very high as the particles 8c are loosely arranged between the electrodes, and the potential of the current source 6 is not sufficient to establish an appreciable current flow through the power relay. An engagement of the instrument contacts 3, 4 shunts out the resistance 8 and establishes a momentary current flow through the coil of relay 12 which constitutes both the inductance for producing the voltage surge and the current-responsive device that is to be actuated. The contact engagement is immediately broken by the fluttering of the contacts, thereby producing a relatively high voltage surge due to the discharge of the energy stored in the magnetic field of the relay 12. This voltage surge does not arc across the separated instrument contacts but travels through the loose particles of the coherer 8 and thereby reduces the ohmic resistance to a low value. The circuit through relay 12 and resistance 8 is now conductive at the low voltage of the source 6, and the relay 12 is energized through the resistance 8. The power relay actuates the load circuit switches and closes switch 15 to energize the resetting solenoid 17 to snap the armature plate 7 to the right. This opens the power circuit at contact 11 and jars the coherer 8 to restore the particles 8c to their loose high-resistance condition. The apparatus is thus reset for further operation under control of the instrument relay.

It is to be noted that the power relay 12 may be of the usual type designed for operation on direct current voltages of the order of from 1½ to 6 volts. The special arrangements previously employed in ultra-sensitive control systems to make a power relay as nearly non-inductive as practical are not necessary and would be undesirable with the new circuits. A highly inductive power relay produces an inductive kick-back of several hundred volts when its circuit is opened, and it is this voltage surge that breaks down the high ohmic resistance of the coherer element. The power relay has not yet closed when its circuit is broken at the instrument contacts and the coherer resistance, in decreasing to its low value as the induced voltage reaches the proper value, thus establishes a continuous current flow through the power relay which then causes its armature to close.

The circuit of Fig. 8 is similar to that of Fig. 6 but includes a second instrument contact 4' connected to a second variable resistance 8' and power relay 12'. A single resetting coil 17 is used for jarring the mounting plates 7, 7' of the respective resistances although of course two separate resetting coils could be used. The circuit elements associated with contact 4 are identical with those shown in Fig. 6 and are identified by corresponding numerals. The corresponding prime numerals identify the circuit elements associated with contact 4', and a detailed description of the circuit is believed to be unnecessary. The Fig. 3 circuit is useful, for instance, as an automatic pilot for aircraft, boats, etc., where closure of the contact arm 3 on either contact 4, 4' causes a proper corrective action of the rudder through the load circuits controlled by switches 14, 14'.

The circuit of Fig. 9 includes a single coherer resistance 8 and an ultra-sensitive relay with opposed contacts 4, 4' for alternately energizing the power relays 12, 12'. Leads 18, 18' extend from the instrument contacts 4, 4' to contacts 19, 19' that are engaged by the armature plate 7 when moved to its respective end positions. Contacts 11, 11' are also positioned for engagement by armature plate 7 and connected to the power relays 12, 12', respectively. The power relay 12' is connected through lead 20 and the normally closed switch 21 of power relay 12 to the positive current source lead 13, and a holding circuit for relay 12' is provided by a lead 22 from the negative potential line 5 and the normally open switch 23 of relay 12'. The second terminal of power relay 12 is directly connected to the positive line 13, and the resetting coil 17 is shunted across the power relay 12'. Relays 12, 12' have switches 14, 14', respectively, for connection to the load circuits.

The circuit elements are illustrated in the positions that they take after a closure of contact arm 3 against the contact 4 of the instrument relay. Power relay 12' is now connected to the current source through the holding switch 21 and resistance 8, and the instrument contact 4' is connected to armature plate 7 through lead 18' and contact 19'. The circuit from contact 4 to the power relay 12 is open at contacts 11, 19; and the relay 12' must be energized before relay 12 can again be energized. A fluttering engagement of contact arm 3 on contact 4' gives rise to an induced voltage surge that reduces the resistance of the coherer 8, and relay 12' is energized. Its armature is attracted to complete a holding circuit through switch 23, and the resetting coil 17 snaps the armature plate 7 to the left to reset the coherer and open the original circuit to relay 12' at contacts 11', 19'. The armature plate 7 now spans the gap between contacts 11, 19, and the instrument contact arm 3 must engage on contact 4 for the next control action. Relay 12' remains energized through its holding circuit until contacts 3, 4 engage to energize relay 12, thereby opening switch 21 of the holding circuit. Spring 10 snaps armature plate 7 back to its illustrated position when the holding circuit is opened, and the jarring of the resistance 8 restores the particles to their loosely arranged high resistance condition. This type of circuit is useful, for instance, in controlling the temperature of a furnace or oven that has a long time lag.

The circuit of Fig. 10 is similar to that of Fig. 8 but includes separate resetting coils 17, 17' for the variable resistances 8, 8', respectively. Each resistance and its associated elements are preferably mounted on an individual base 24, 24'. Condensers 25, 25' are shown between plate 7, contact 11 and plate 7', contact 11', respectively, to prevent false operation from transient voltages generated within the control system by arcing power contacts; other condensers may be used in the battery leads and other parts of the circuit to suppress surges of static or other transients that originate outside of the control circuits. The load circuit switches 14, 14' are single throw normally open switches that control the energization of the elements 26, 26' of a reversible motor device 27 or other alarm or control device from a current source 28 through leads 29, 30 and 29', 30', respectively. The remaining elements of the Fig. 10 circuit are substantially identical with parts shown in Fig. 8 and are identified by the corresponding reference numerals.

The described embodiments of the invention effect an immediate resetting of the coherer resistances upon the energization of the power relays, whether or not the power relay is locked in, as in the Fig. 9 circuit. Delayed resetting may be necessary for counting large slowly moving objects of approximately constant size and speed, operating railroad and traffic signals and for many other purposes.

The delayed resetting circuit of Fig. 11 is similar to the Fig. 6 circuit and like parts are identified by the corresponding reference numerals. The circuit 16 of the resetting coil 17 includes the normally open switch 31 of a timing device 32 that is controlled by switch 15 of the power relay 12. The operating element 33 of the timing device is connected to line 5 by lead 34, and to line 13 by lead 35, switch 15 and lead 36. Slow acting relays, motor driven timers, thermal timers and other commercially available equipment may be used as the timing device to meet the design requirements as to the length of the delay period, space or weight, and cost.

A delayed resetting based upon a particular sequence of operations is provided by the elements shown in the fragmentary circuit diagram of Fig. 12. The relay switch 14 controls the power supply to the motor mechanism 37 for opening a door 38, and the switch 31' of the resetting circuit is so placed that it is closed by the door 37 when it reaches full open position. The resistance 8 is then reset to open the power relay circuit and the door closes automatically in known manner.

The prior practice has been to design the instrument and its contacts to reduce vibration and the attendant chattering of the contacts as they move into engagement. A make-and-break contact engagement is beneficial to the operation of the present relay circuits and the physical constructions are preferably such as to promote a continuous vibration of the contacts. As shown in Fig. 13, the contact arm 3a and contacts 4a are very fine springy wires or ribbons of relatively great length similar to the antenna of an insect. Where less space is available, the contacts 4b of spring wire may each include a loosely coiled section, as shown in Fig. 14, to encourage continuous vibration of the contacts. A simpler construction, as shown in Fig. 15, is possible when the "high" and "low" contacts of the instrument relay may be electrically connected. The contact arm 3c includes a coil section and terminates in an upturned end that projects into the looped end of the contact 4c which also includes a coiled section.

The spring contacts are always in relative motion, although this motion is sometimes too small to be apparent to the naked eye, and tend to keep themselves clean at the point of contact, and the particles and films that cause prior contacts to fail create little or no difficulty with the freely vibrating contacts. The fluttering of the contacts, at the frequency at which they are vibrating, causes them to hit together with an appreciable impact in spite of the low pressures that can be developed by the small and light moving system of an ultra-sensitive instrument relay.

It is to be understood that the embodiments herein shown and described are illustrative of the invention and that various changes may be made in the design and relative arrangement of the circuit elements without departing from the spirit of my invention as set forth in the following claims.

I claim:

1. In a control system, the combination with a controlled circuit including in series as circuit elements thereof a source of current, a current-responsive device, voltage-inducing means, and a coherer having a normal resistance precluding appreciable current flow in said circuit, of means for establishing a flow of current through said current-responsive device, said means consisting of a primary control circuit shunted across one of said circuit elements for establishing an initial current flow through said voltage-inducing means, whereby the interruption of said initial current flow produces an induced voltage discharge through said coherer to reduce the resistance thereof.

2. In a control system, the invention as claimed in claim 1, wherein said primary control circuit comprises circuit elements including the contacts of a sensitive instrument type relay, and means for energizing said relay.

3. In a control system, the invention as claimed in claim 1, wherein said primary control circuit comprises a normally closed circuit of high resistance, and means for reducing the resistance of said normally closed circuit.

4. In a control system, the invention as claimed in claim 1, wherein said voltage-inducing means is an inductive winding.

5. In a control system, the invention as claimed in claim 1, wherein said current-responsive device includes an inductance and comprises said voltage-inducing means.

6. In a control system, a controlled circuit including in series as circuit elements thereof a source of current, a current-responsive device including a movable member, an inductance, and a coherer having a normal resistance precluding appreciable current flow in said circuit; of means comprising a circuit shunted across one of said circuit elements to reduce the resistance of said coherer to a current-conducting value, and means for restoring the resistance of said coherer to its normal non-conducting value, said restoring means being independent of said current-responsive device.

7. In a control system, the invention as claimed in claim 6, wherein said restoring means comprises an electrically operated device, and means coupling said electrically operated device to said series circuit for energization upon current flow in said series circuit.

8. In a control system, the combinations with a controlled circuit having as series elements thereof a source of current, a motor device having a movable member and an inductive winding, and a coherer normally precluding current flow in said controlled circuit, of means consisting of a primary control circuit shunted across one of said circuit elements for establishing an initial current flow in said controlled circuit, whereby interruption of said initial current flow produces an inductive voltage discharge through said coherer to reduce the resistance thereof.

9. In a control system, the invention as claimed in claim 8, in combination with means for resetting said coherer to restore the normally high resistance thereof, said resetting means including a coherer-actuating member movable independently of the movable member of said motor means.

10. A control system comprising a motor device controlling a normally open switch and the energization of a load device, a source of current, circuit elements including a variable resistance and a normally closed switch connecting said motor device across said current source, said resistance comprising conductive particles loosely disposed between two electrodes, a sensitive instrument having relatively movable contacts shunted across said variable resistance, and resetting means in a circuit controlled by said normally open switch for opening the normally closed switch and disturbing the low-resistance condition of said conductive particles that results from an engagement of the relatively movable contacts of said instrument.

11. A control system comprising a source of current, a power relay controlling a normally open switch and switch means for the energization of a load circuit, circuit elements including a variable resistance of the loosely arranged conductive particle type connecting said relay in circuit with said source of current, a sensitive instrument having relative movable contacts connected in shunt with said variable resistance, whereby a fluctuating engagement of said contacts results in a reduction in the normally high resistance of said variable resistance and thereby energizes said relay, and resetting means including an electrically-actuated member energized by the closing of said normally open switch for restoring the normal high resistance of said variable resistance.

12. A control system comprising a normally closed circuit having as series circuit elements a source of current, a voltage-inducing means, a motor device, and a coherer, the normal ohmic resistance of said coherer precluding current flow through said circuit; means comprising a circuit shunted across one of said circuit elements for reducing the ohmic resistance of said coherer to a low value for the energization of said motor device; a resetting device structurally independent of said motor device for restoring the normal high resistance of said coherer, and means controlled by said motor device for energizing said resetting device.

13. A control system comprising a source of current, a power relay, a normally closed circuit including a coherer of the loose particle type connecting said relay across said current source, the normal ohmic resistance of said coherer precluding current flow through said circuit, means for reducing the ohmic resistance of said coherer to a low value for the energization of said power relay, said means being an ultra-sensitive relay having the contacts thereof shunted across said coherer, a resetting device for restoring the normal high resistance of said coherer, time delay means for energizing said resetting device, and means controlled by said power relay for rendering said time delay means operative.

14. A relay system comprising a source of current, a pair of power relays, a normally closed circuit connecting each power relay to said current source through a coherer of the loose particle type, means comprising an ultra-sensitive relay for producing voltage surges to reduce the ohmic resistance of said coherers, said ultra-sensitive relay having contacts and a contact arm in shunt with the respective coherers, and resetting means controlled by said power relays for restoring the normally high ohmic resistance of said coherers after a reduction thereof due to voltage surges produced by an engagement of said ultra-sensitive relay contacts.

15. A relay system as claimed in claim 14, wherein said resetting means comprises a single resetting device.

16. A relay system as claimed in claim 14, wherein said resetting means comprises a separate resetting device for each variable resistance.

17. A relay system comprising a source of current, a pair of power relays, a coherer of the loose particle type, movable mounting means for said coherer, circuits alternatively operable to connect one or the other of said power relays across said current source through said coherer in accordance with the position of said mounting means, means comprising an ultra-sensitive relay for producing voltage surges through said coherer to reduce the ohmic resistance thereof, the ultra-sensitive relay having relatively fixed contacts connected to the respective alternatively operable circuits, means controlled by one power relay to break the alternatively operable circuit that includes that power relay, means including a normally closed switch of the other power relay and a normally open switch of the first power relay for completing a holding circuit for the first power relay, means tending to retain said mounting means in position to complete the circuit through said coherer to the first power relay, and means operable on the energization of the first power relay to displace said mounting means to close the circuit to the second power relay through said coherer.

18. In a relay system, the combination with a controlled circuit having as series elements thereof a source of current, a power relay, and a coherer of the loose particle type connecting said power relay across said current source, of means for producing an inductive voltage surge from said power relay to reduce the normally high ohmic resistance of said coherer to a low current-conducting value, said means comprising an ultra-sensitive relay having freely vibrating spring contacts shunted across one of said circuit elements.

19. In a relay system, the invention as claimed in claim 18, wherein said contacts comprise elongated fine spring wires.

20. In a relay system, the invention as claimed in claim 18, wherein said contacts comprise fine spring wires having the intermediate sections thereof coiled to promote vibration.

21. In a relay system, the invention as claimed in claim 18, wherein said contacts comprise a contact arm having an outer end at an angle to the contact arm, and a spring contact terminating in a loop surrounding the outer end of said contact arm.

22. In a relay system, a source of current, a power relay, a load circuit controlled by said power relay, a circuit including a coherer of the loose particle type connecting said power relay to said current source, an ultra-sensitive relay having contacts shunted across said coherer, whereby a fluttering engagement of said ultra-sensitive relay contacts produces a voltage surge to establish a current-conductive condition of said coherer for energization of said power relay, a resetting device for said coherer to restore the high ohmic resistance thereof, and an energizing circuit for said resetting device, said energizing circuit including a normally open switch operable independently of said power relay.

ANTHONY H. LAMB.